(12) United States Patent
Sharp et al.

(10) Patent No.: US 9,558,146 B2
(45) Date of Patent: Jan. 31, 2017

(54) IWARP RDMA READ EXTENSIONS

(71) Applicant: Intel Corporation, Santa Clara, CA (US)

(72) Inventors: Robert O. Sharp, Round Rock, TX (US); Donald E. Wood, Austin, TX (US); Kenneth G. Keels, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 662 days.

(21) Appl. No.: 13/945,358

(22) Filed: Jul. 18, 2013

(65) Prior Publication Data

US 2015/0026286 A1 Jan. 22, 2015

(51) Int. Cl.
*G06F 15/167* (2006.01)
(52) U.S. Cl.
CPC .................................. *G06F 15/167* (2013.01)
(58) Field of Classification Search
CPC ................................................... G06F 15/167
USPC ....................................................... 709/212
See application file for complete search history.

(56) References Cited

U.S. PATENT DOCUMENTS

| 2005/0132017 | A1* | 6/2005 | Biran | G06F 13/28 |
| | | | | 709/212 |
| 2010/0183024 | A1* | 7/2010 | Gupta | H04L 1/0072 |
| | | | | 370/463 |
| 2012/0131124 | A1* | 5/2012 | Frey | G06F 15/16 |
| | | | | 709/212 |
| 2013/0117621 | A1* | 5/2013 | Saraiya | H04L 49/356 |
| | | | | 714/748 |
| 2014/0222945 | A1* | 8/2014 | Noronha | G06F 12/02 |
| | | | | 709/212 |
| 2014/0344329 | A1* | 11/2014 | Fox | G06F 15/17331 |
| | | | | 709/203 |
| 2015/0006478 | A1* | 1/2015 | Raymond | G06F 17/30575 |
| | | | | 707/610 |

OTHER PUBLICATIONS

Recio, RFC 5040 "A Remote Direct Memory Access Protocol Specification," Oct. 2007, Network Working Group.*

* cited by examiner

*Primary Examiner* — Imad Hussain
*Assistant Examiner* — Meriam Abisourour
(74) *Attorney, Agent, or Firm* — Law Office of R. Alan Burnett, P.S.

(57) ABSTRACT

Apparatus, method and system for supporting Remote Direct Memory Access (RDMA) Read V2 Request and Response messages using the Internet Wide Area RDMA Protocol (iWARP). iWARP logic in an RDMA Network Interface Controller (RNIC) is configured to generate a new RDMA Read V2 Request message and generate a new RDMA Read V2 Response message in response to a received RDMA Read V2 Request message, and send the messages to an RDMA remote peer using iWARP implemented over an Ethernet network. The iWARP logic is further configured to process RDMA Read V2 Response messages received from the RDMA remote peer, and to write data contained in the messages to appropriate locations using DMA transfers from buffers on the RNIC into system memory. In addition, the new semantics removes the need for extra operations to grant and revoke remote access rights.

30 Claims, 6 Drawing Sheets

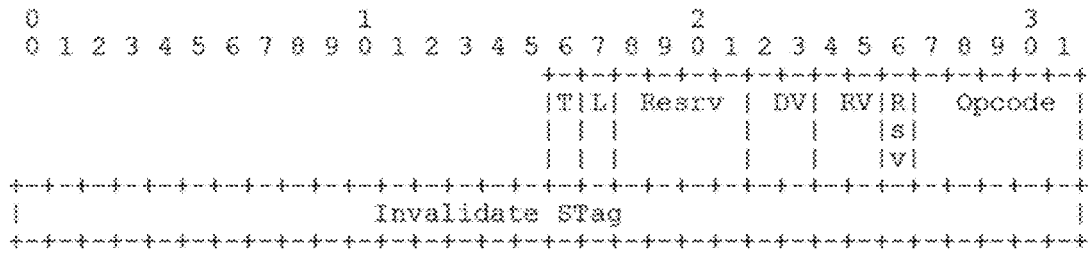
Fig. 3
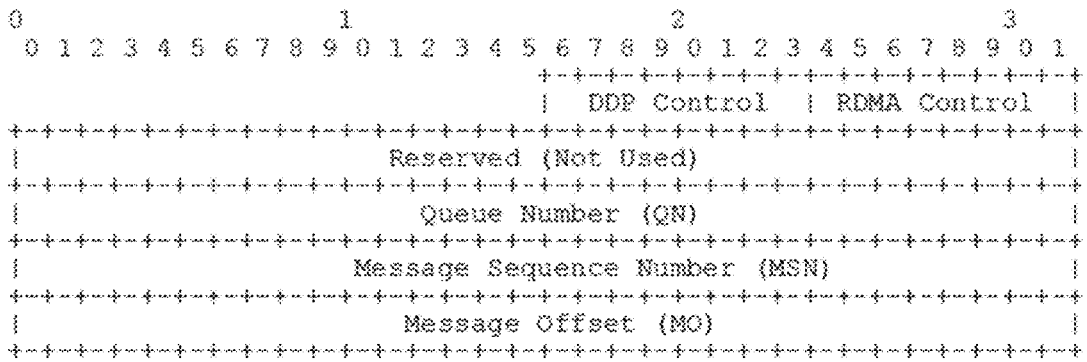
Fig. 4
```
 0                   1                   2                   3
 0 1 2 3 4 5 6 7 8 9 0 1 2 3 4 5 6 7 8 9 0 1 2 3 4 5 6 7 8 9 0 1
                                +-+-+-+-+-+-+-+-+-+-+-+-+-+-+-+-+
                                |  DDP Control  |  RDMA Control |
+-+-+-+-+-+-+-+-+-+-+-+-+-+-+-+-+-+-+-+-+-+-+-+-+-+-+-+-+-+-+-+-+
|                      Reserved (Not Used)                      |
+-+-+-+-+-+-+-+-+-+-+-+-+-+-+-+-+-+-+-+-+-+-+-+-+-+-+-+-+-+-+-+-+
|                        Queue Number (QN)                      |
+-+-+-+-+-+-+-+-+-+-+-+-+-+-+-+-+-+-+-+-+-+-+-+-+-+-+-+-+-+-+-+-+
|                   Message Sequence Number (MSN)               |
+-+-+-+-+-+-+-+-+-+-+-+-+-+-+-+-+-+-+-+-+-+-+-+-+-+-+-+-+-+-+-+-+
|                       Message Offset (MO)                     |
+-+-+-+-+-+-+-+-+-+-+-+-+-+-+-+-+-+-+-+-+-+-+-+-+-+-+-+-+-+-+-+-+
```
Fig. 7

| RDMA Message OpCode | Message Type | RDMA Header Used | ULP Message allowed in the RDMA Message |
|---|---|---|---|
| 10001b | RDMA Read Request V2 | RDMA Read Request Header V2 | No |
| 10010b | RDMA Read Response V2 | None | No |

Fig. 5
500

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                  RDMA Read Message Size (RDMARDSZ)            |
+-+-+-+-+-+-+-+-+-+-+-+-+-+-+-+-+-+-+-+-+-+-+-+-+-+-+-+-+-+-+-+-+
|                     Data Source STag (SrcSTag)                |
+-+-+-+-+-+-+-+-+-+-+-+-+-+-+-+-+-+-+-+-+-+-+-+-+-+-+-+-+-+-+-+-+
|                  Data Source Tagged Offset (SrcTO)            |
+                                                               +
|                                                               |
+-+-+-+-+-+-+-+-+-+-+-+-+-+-+-+-+-+-+-+-+-+-+-+-+-+-+-+-+-+-+-+-+
```

Fig. 6
600

IWARP RDMA READ EXTENSIONS

FIELD OF THE INVENTION

The field of invention relates generally to computer systems and networking and, more specifically but not exclusively relates to techniques for implementing extended RDMA Read operations for iWARP.

BACKGROUND INFORMATION

Remote Direct Memory Access (RDMA) is a direct memory access mechanism that enables a computer to access memory from another computer without involving the computers' operating systems. RDMA supports zero-copy networking by enabling a network adapter to transfer data directly to or from application memory, eliminating the need to copy data between application memory and the data buffers in the operating system. Such transfers require no work to be done by CPUs, caches, or context switches, and transfers continue in parallel with other system operations. When an application performs an RDMA Read or Write request, the application data is delivered directly to the network (via appropriate hardware), reducing latency and enabling fast message transfer.

Current RDMA-enabled network adapters such as Internet Wide Area RDMA Protocol (iWARP) RDMA Network Interface Controllers (RNICs) or InfiniBand HCAs (Host Channel Adapters) allow applications to communicate with hardware directly from the application address space. This is enabled by supporting numerous hardware queues—Send Queues (SQ) and Receive Queues (RQ) that can be mapped and directly accessed from the application address space through use of Memory Mapped Input/Output (MMIO) in the RNIC or HCA. Every time an application posts a new transmit or receive work request (WR), this request is added to the respective SQ or RQ by the user space library supplied by the hardware provider.

On one level, the RDMA architecture is designed to provide an abstraction between RDMA interfaces and the underlying network technology (e.g., Ethernet and Infini-Band). For example, the Remote Direct Memory Access Protocol (RDMAP) is designed to operate over the Direct Data Placement Protocol (DDP), which in turn interfaces (with other lower layers) to the RNIC or HCA. Ideally, the RDMAP should expose a consistent interface to applications in a network-technology agnostic manner, thereby enabling the same application to implement RDMA on any network technology that supports RDMA. However, various network technology-specific extensions have been added to various RDMA specifications over the years, resulting in some level of fragmentation.

One example of such fragmentation concerns support for RDMA Read operations. iWARP was originally specified with different RDMA Read semantics than other RDMA capable technologies. This created an application-visible difference between iWARP and other RDMA technologies such as InfiniBand. Accordingly, it would be advantageous to add extended RDMA Read operations to iWARP.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 3 is diagram depicting an DDP control and RDMAP control fields having a format including an extended opcode field that includes new opcodes to support RDMA Read V2 Request and Read V2 Response messages;

FIG. 4 is a table defining the values of an RDMA opcode field used for the RDMA Read V2 Request and Read V2 Response messages, according to one embodiment;

FIG. 5 is a table defining which RDMA header is used for the new Read V2 Request message and showing that no RDMA header is used for the RDMA Read V2 Response message, according to one embodiment;

FIG. 6 is a diagram depicting an RDMAP header that is used for RDMA Read V2 Request messages, according to one embodiment;

FIG. 7 is a diagram depicting an untagged buffer DDP header employed for each of the RDMA Read V2 Request and RDMA Read V2 Response messages, according to one embodiment;

DETAILED DESCRIPTION

Embodiments of methods, apparatus, and systems for implementing new RDMA Read V2 Request and Read V2 Response messages using iWARP are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
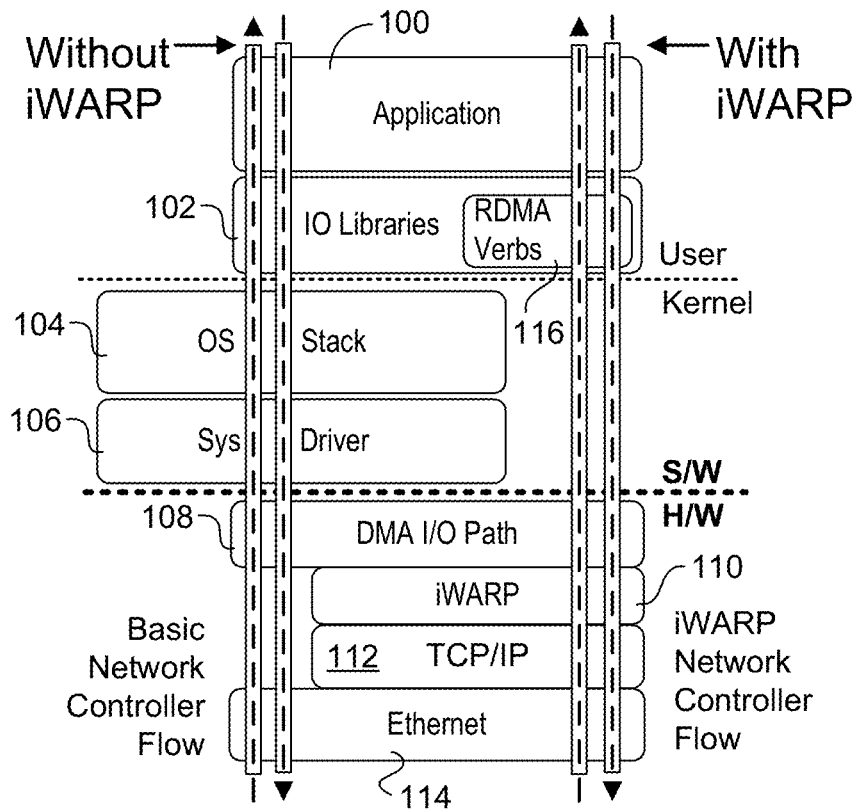
FIG. 1 is a diagram illustrating a comparison between a conventional network data transfer and an iWARP data transfer.

To better understand and appreciate aspects and advantages of the embodiments, the following primer on basic iWARP technologies is provided. The diagram of FIG. 1 illustrates a comparison between a conventional network data transfer (labeled without iWARP) and an iWARP network data transfer. The blocks illustrated in FIG. 1 include an application layer 100, Input/Output (IO) libraries 102, an Operating System (OS) network stack 104, a system driver 106, a DMA I/O Path 108, an iWARP layer 110, TCP/IP layers 112, and an Ethernet layer 114. As illustrated, each of application layer 100, IO libraries 102, OS network stack 104, and system driver 106 comprise software entities, while the entities below the S/W-H/W line comprise hardware-based entities.

Under the conventional (i.e., without iWARP) approach, packet processing is performed via the OS network stack 104, which resides in the OS kernel. This requires use of both OS kernel resources and processor core cycles. In contrast, RDMA (and iWARP) enables direct memory access to memory on a remote system in a manner that bypasses the system CPU and operating system (for fast-path operations). RDMA supports zero-copy networking by enabling an RNIC to transfer data directly to or from application memory (i.e., a memory space in system memory allocated to an application) that is maintained separate for kernel memory used by an operating system, eliminating the need to copy data between application memory and data buffers in kernel memory employed by the operating system. This is facilitated via DMA operations under which a DMA engine on an RNIC is enabled to directly write to and read from data buffers in system memory that have been allocated for access by the RNIC. For iWARP-specific RDMA implementations, this is further facilitated through use iWARP layer 110 at the hardware level and RDMA Verbs 116 in OS user space.

The RDMA Consortium has published the RDMA Protocol Verbs Specification that describes the behavior of RNIC hardware, firmware, and software as viewed by the RNIC host (i.e., computer system or platform in which an RNIC is implemented). The behavior description is specified in the form of an RNIC Interface and a set of RNIC Verbs. An RNIC Interface defines the semantics of the RDMA services that are provided by an RNIC that supports the RNIC Verb Specification, and can be implemented through a combination of hardware, firmware, and software. A Verb is an operation that an RNIC Interface is expected to perform. The current draft RDMA Verbs specification is published at http://tools.ietf.org/html/draft-hilland-rddp-verbs-00. As used herein below, the specification is referred to as RDMA Verbs.

RDMA Verbs defines a mechanism for allocating memory called Memory Registration. Memory registration enables access to a Memory Region by a specific RNIC. Binding a Memory Window enables the specific RNIC to access memory represented by that Memory Window. Memory registration provides mechanisms that allow consumers (i.e., the applications that employ RDMA for data transfers) to describe a set of virtually contiguous memory locations or a set of physically contiguous locations to the RNIC in order to allow the RNIC to access either as a virtually contiguous buffer using a Steering Tag (STag) and a Tagged Offset (TO). Memory registration provides the RNIC with a mapping between a STag and TO and a Physical Memory Address. It also provides the RNIC with a description of the access control associated with the memory location. The set of memory locations that have been registered are referred to as a Memory Region. Before an RNIC can use a Memory Region, the resources associated with the Memory Region are allocated and the Memory Region is registered with the RNIC. This phase of operation is associated with RDMA control path operations, which involves use of the OS kernel and RNIC driver.

Under a conventional use of RDMA, the RDMA components at both ends of an RDMA communication channel (i.e., components at a sending and a receiving computer platform, commonly referred to as local and remote RDMA peers) allocate (or request allocation from the OS of) buffers in system memory for a given application. A data transfer between applications is performed by copying data in a source buffer in the sender's computer to a destination (sink) buffer on the receiver's computer.

Through implementation of a memory registration scheme, buffers used for an RDMA data transfer are registered with the RNICs prior to initiating the actual data transfer. This is facilitated, in part, through use of work requests (WRs). Each WR defines: 1) the data transfer operation type (Send, Receive, RDMA Read, RDMA Write); 2) The source buffer for Sends, RDMA Reads and RDMA Writes; and 3) The destination buffer for Receives, RDMA Reads and RDMA Writes. In turn, each of the source and destination buffers has an explicitly defined location (i.e., address range) within a memory region. After registration, these buffers are referred to as "tagged buffers" and are identified by unique STags, as discussed above.

Figure 2:
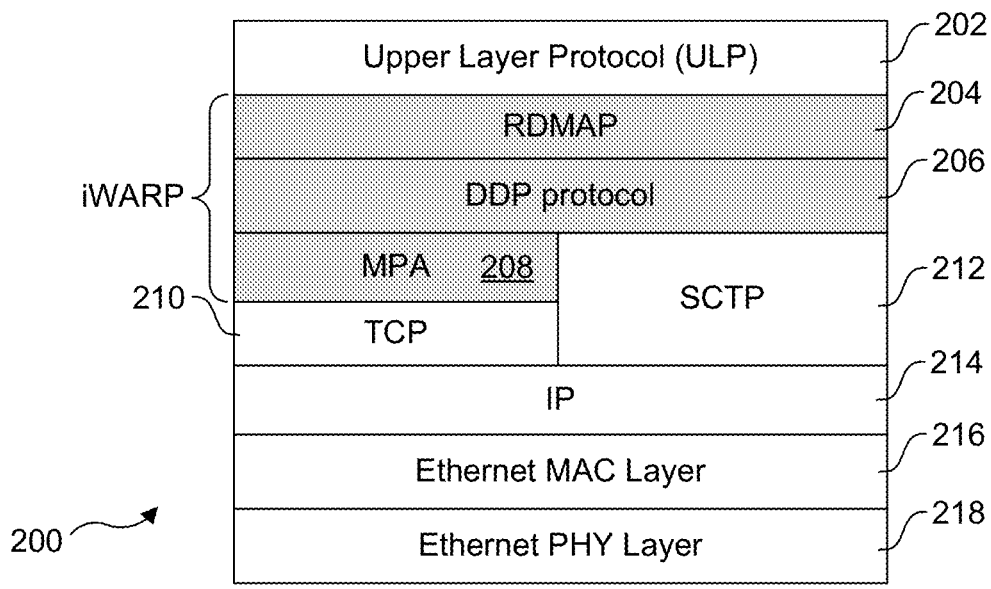
FIG. 2 is a diagram illustrating an iWARP reference model.

FIG. 2 shows an illustration of an iWARP reference model 200. The model includes an Upper Layer Protocol layer 202, an RDMAP layer 204, a DDP protocol layer 206, a Marker Protocol Data Unit (PDU) Alignment (MPA) layer 208, a TCP layer 210, a Stream Control Transmission Protocol (SCTP) layer 212, an IP layer 214, an Ethernet MAC layer 216, and an Ethernet PHY layer 218. Details for implementing RDMAP operations are provided in IETF RFC 5040, RDMA Protocol Specification. Details for implementing DPP operations are provided in IETF RFC 5041, DDP Protocol Specification. Details for implementation of MPA layer 208 are provided in IETF RFC 5044, Marker PDU Aligned Framing for the TCP Specification. MPA is designed to work as an adaptation layer between TCP and the DDP protocol.

New RDMA Read V2 Request V2 and Read V2 Response V2 Messages for iWARP

RFC 5040 defined the RDMA Read operation for iWARP in a way that requires an application to grant remote access rights to local memory. This definition simplifies hardware but creates two application visible differences when compared to other RDMA technologies. The first is that an application may only use a single reference to local memory per RDMA Read. The second is that an application must register local memory with remote access rights. Typical applications also revoke the remote access rights as soon as possible after the operation referencing the local memory is complete. Applications must submit one or two additional operations in order to accomplish rights management.

As discussed above, iWARP RDMA has the concept of memory regions that are represented by STags. Each STag has access rights associated with it. For iWARP, the local STag for RDMA Read (this is the data sink buffer) is exposed in the RDMA Read Request and is also used in the RDMA Read Response. Essentially, RDMA Read Responses for iWARP look very much like RDMA Writes. This is a difference from InfiniBand's definition for corresponding Read Requests and Responses. Moreover, iWARP cannot directly adopt the InfiniBand approach without major re-work of the wire protocol.

A recent proposed addition to the iWARP standard that is under consideration in the IETF added Atomic operations.

The definition of Atomic operations allows further extensions in accordance with embodiments herein that will support application transparency without major changes to the existing iWARP wire protocol. The further extensions include the following:

1. Add two new opcodes to the iWARP standard: a) RDMA Read V2 Request, and b) RDMA Read V2 Response.
2. Define an RDMA Read V2 RDMAP untagged Upper Layer Protocol Data Unit (ULPDU) that uses a new RDMA Read Request header following the DDP header. This new header removes the Data Sink STag and Data Sink Tagged Offset from the current (i.e., RFC 5040 defined) RDMA Read Request header. The new header begins with the RDMA Read Message Size field in the existing RDMA Read Request header defined in section 4.4 of RFC 5040.
3. Describe that the RDMA Read v2 Response message is simply an untagged DDP response message that targets the new queue number 3 defined for Atomic responses.

Once these changes have been described, the implementation of the new RDMA Read semantics will allow multiple local data buffers to be included with the RDMA Read V2 Request and the RDMA Read V2 Response will place data into these buffers without requiring remote access rights since the new Read Response is an untagged DDP message. In addition, the new semantics removes the need for extra operations to grant and revoke remote access rights.

The control information of RDMA Messages is included in DDP protocol [RFC5041] defined header fields, with the following new formats. The new RDMA Read Request operation includes a revised definition data following the untagged RDMAP header that removes the Data Sink STag and Tagged Offset fields.

The RDMA Messages use all 8 bits of the RDMAP Control Field. The first octet reserved for ULP use in the DDP Protocol is used by the RDMAP to carry the RDMAP Control Field. The ordering of the bits in the first octet are shown in RDMA header 300 of FIG. 3, which depicts the format of the DDP Control and RDMAP Control fields, in the style and convention of RFC 5040. The fields include a 1-bit tagged (T) flag, a 1-bit (L) flag (aka L-bit), a 4-bit reserved field, a DDP version (DV) field, an RDMA version (RV) field, a 1-bit reserved field, a 5-bit opcode field, and an Invalidate STag field. In the illustrated embodiment, the beginning of the DDP Control information is offset by 16 bits to accommodate the MPA header.

Table 400 of FIG. 4 defines the values of an RDMA opcode field used for the RDMA Read V2 Request and RDMA Read V2 Response messages, according to one embodiment. The opcode field has been extended one additional bit (relative to the field defined in RFC 5040, a new additional bit (at bit 27) is added) to accommodate the additional opcodes. Existing opcodes defined in RFC 5040 set the additional bit (bit 27) to a 0. Table 400 also defines when the STag, Tagged Offset, and Queue Number fields must be provided for the RDMA Immediate Data Messages, according to one embodiment.

In one embodiment the following conditions are met for RDMA Read V2 Request and Read V2 Response messages. First, the RDMA Version (RV) field is set to 10b. Second, the opcode field shown in table 400 is used. Third, the Invalidate STag is set to zero by the sender, and is ignored by the receiver.

Table 500 of FIG. 5 defines which RDMA Headers are used on each new Read V2 Request and Read V2 Response message. As shown, a ULP message is not allowed for either an RDMA Read V2 Request message or an RDMA Read V2 Response message.

The RDMA Read V2 Request message carries an RDMA Read V2 Request header that describes the Data Source Buffers used by the RDMA Read operation. The RDMA Read Request Header immediately follows the DDP header. The RDMAP layer passes to the DDP layer an RDMAP Control Field. Diagram 600 of FIG. 6 depicts the RDMA Read V2 Request header that is used for all RDMA Read V2 Request messages, according to one embodiment. The RDMA Read Message Size, Data Source STag, and Data Source Tagged Offset parameters are the same as defined in RFC 5040 section 4.4.

The RDMA Read V2 Response message does not include an RDMAP header. The RDMAP layer passes to the DDP layer an RDMAP Control Field. The RDMA Read V2 Response message is fully described by the DDP Headers of the DDP Segments associated with the message.

Ordering and completion rules for RDMA Read V2 Requests are the same as those for an RDMA Read Request Message as described in section 5.2.1 of RFC 5040 with one exception: The Local Peer is no longer required to use multiple RDMA Read V2 Request Messages if the Local Peer wishes to reference multiple data sink buffers. This is because RDMA Read V2 Responses are untagged. Ordering and completion rules for RDMA Read V2 Responses are the same as the Send operation described in section 5.3 of RFC 5040 for a Remote Peer with the exception that the queue number field for the DDP layer is 3.

In further detail, each of the RDMA Read V2 Request and RDMA Read V2 Response messages are untagged RDMA messages that employ an untagged buffer DDP header 700, as shown in FIG. 7. For the RDMA Read V2 Request message, the queue number (QN) field value is set to 1. For the RDMA Read V2 Response message, the QN field value is set to 3. Usage of the Message Sequence Number (MSN) field, Message Offset (MO) field, and L-bit in connection with the RDMA Read V2 Request and RDMA Read V2 Response messages is explained in detail below.

Exemplary iWARP System Architecture

Figure 8:
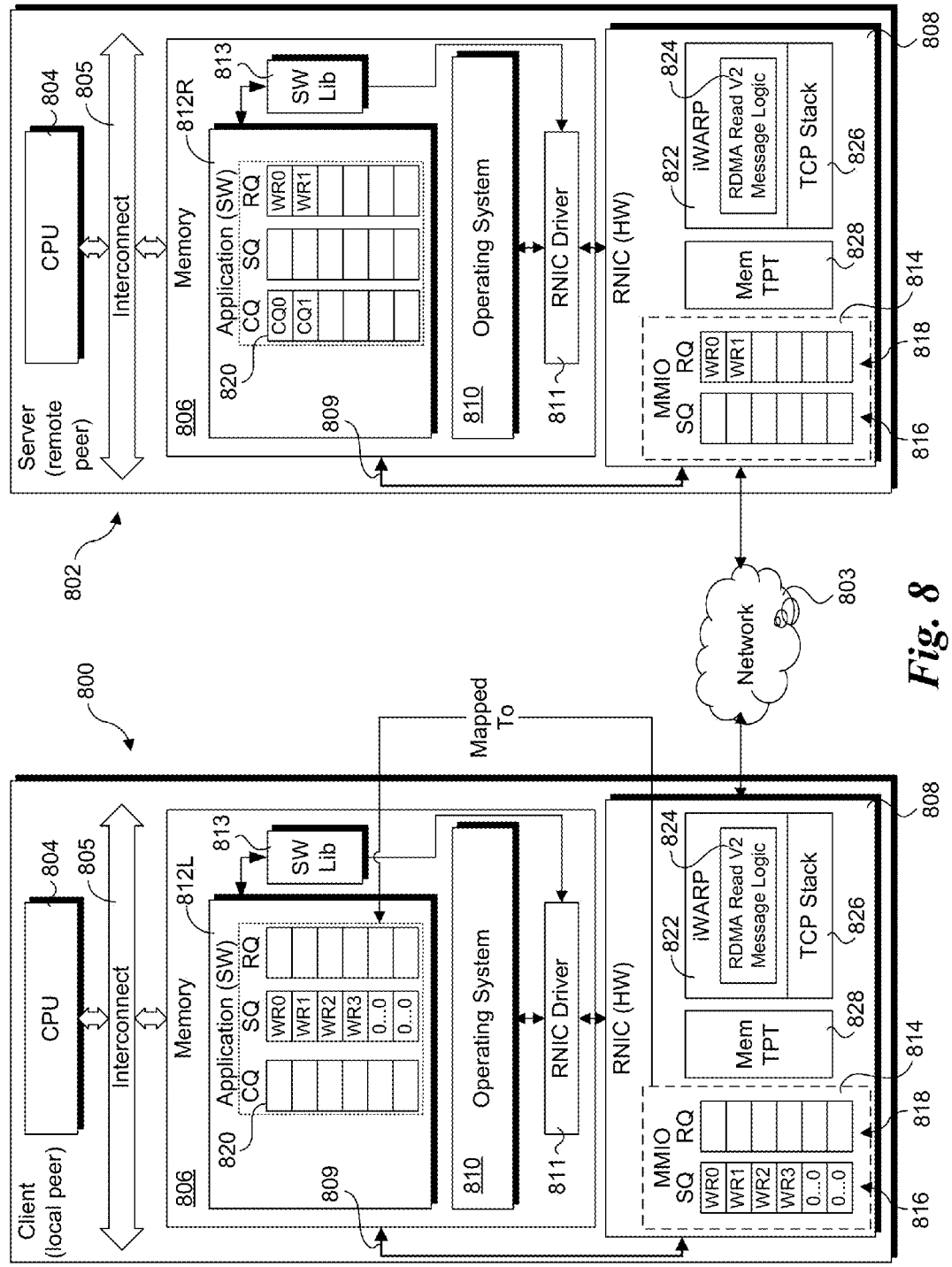
FIG. 8 is a schematic diagram of an exemplary iWARP system architecture illustrating selected components configured to facilitate implementation of iWARP RDMA Read V2 Request and RDMA Read V2 Response messages in accordance with embodiments disclosed herein.

FIG. 8 shows an exemplary iWARP system architecture illustrating selected components configured to facilitate iWARP RDMA Read V2 Request and RDMA Read V2 Response messages in accordance with aspects of the embodiments disclosed herein. The system includes a client 800 and a server 802 that are configured to support iWARP data transfers over a network 803 using associated hardware and software components, as described herein. Although depicted as a client and server in FIG. 8, the two illustrated devices may also correspond to a pair of peer machines (e.g., RDMA local and remote peers comprising computers, servers, etc.) that exchange data using RDMA over the iWARP wire protocol. Also, the terms "software" and "hardware" may be generally used herein to refer to operations performed by one or more software components or one or more hardware components, without making explicit reference to any particular software or hardware component. In the illustrated embodiment, each of client 800 and server 802 has a similar configuration, although this is not required. Also depicted for some components is a suffix "L" or "R," which respectively correspond to the Local or Remote RDMA peer; for convenience, these suffixes may or may not be referred to in the discussion below, but rather reference to just the base reference number without the suffix is used.

Client 800 includes a Central Processing Unit (CPU) 804 operatively coupled to system memory 806 via an interconnect 805. In general system memory will be accessed via a memory controller or the like (not shown) that is coupled to interconnect 805, or the memory controller is otherwise operatively coupled to the CPU. In some embodiments, CPU 804 is a multi-core processor with multiple cores including local caches (e.g., L1 and L2 caches), with each core operatively coupled to interconnect 805, which in one embodiment comprises a coherent interconnect that employs a protocol to support memory and cache coherency. In one embodiment, interconnect 805 comprises an Intel® Quick-Path™ Interconnect (QPI) that employs the QPI protocol.

Client 800 also includes an RNIC 808 that is operatively coupled to system memory 806 in a manner that enables DMA data transfers between buffers on RNIC 808 and system memory 806. In the illustrated example, this is depicted as being facilitated by an interconnect 809, such as but not limited to a Peripheral Component Interconnect Express (PCIe) interconnect. Although depicted for simplicity as a single interconnect, there may be one or more levels of interconnect hierarchy including applicable interfaces and/or interconnect bridging. For example, in one embodiment, RNIC 808 is operatively coupled to interconnect 805 and is configured to perform DMA operations using the protocol used by interconnect 805.

System memory 806 is used for storing instructions and data relating to various software components, as depicted by an operating system 810, an RNIC driver 811, an RDMA application 812, and a software (SW) library 813. Prior to being loaded into system memory, software instructions and data used to implement the software components are stored on a storage device such as a disk drive or non-volatile memory (not shown). A portion of the memory address space allocated for RDMA application 812 comprises a MMIO address space 814 accessed by RNIC 808. For illustrative purposes, two instances of the same data structures and data are depicted for each of RDMA application 812 and MMIO address space 814; however, it will be recognized that the physical storage for data in the MMIO address space is located in system memory 806 rather than on RNIC 808. At the same time, a portion or portions of the MMIO address space may be cached locally on RNIC 808 under some embodiments.

The MMIO address space includes a Send Queue (SQ) 816 comprising a circular buffer including a plurality of WR entry slots in which Work Request Entries (WREs) are stored, and a Receive Queue (RQ) 818 comprising a circular buffer including a plurality of WR entry slots in which WREs are stored. Other types of buffers may also be used. RDMA application 812 also includes a Completion Queue (CQ) 820 in which Complete Queue Entries (CQEs) are stored.

In the embodiment illustrated in FIG. 8, RNIC 808 includes an iWARP logic block 822 including RDMA Read V2 message logic 824, and a TCP stack 826. In addition to logic for supporting the RDMA Read V2 Request and Response message operations, iWARP logic block 822 includes logic for performing both local and remote RDMA peer operations defined in various RDMA specifications, such as the IETF RFC specifications referenced herein. TCP stack 826 is illustrative of lower networking layers configured to facilitate Ethernet communication using the TCP protocol, including a TCP layer, an IP layer, a MAC layer, and a Physical (PHY) layer.

SQ 816 is accessed by both Software (e.g., software library 813) and Hardware (i.e., RNIC 808). Software library 813 is configured to communicate with RNIC driver 811, which provides the software communication interface to RNIC 808. Software library 813 also provides an interface to RDMA application 812 and writes to SQ 816 to post new WRs. Under some embodiments, software library 813 periodically rings a "doorbell" to notify RNIC 808 about new posted WRs. RNIC 808 reads WRs from SQ 816, and processes them.

RNIC 808 also is depicted as including a memory translation and protection table (TPT) 828. The memory TPT, which optionally may be stored in system memory and cached on the RNIC, includes registration entries that are used to translate addresses and validate data that is being transmitted from or placed into registered buffers. For example, memory TPT is configured to receive STtag and Tag Offset inputs and map them to corresponding memory addresses.

RDMA Read V2 Request/Response Example

Figure 9:
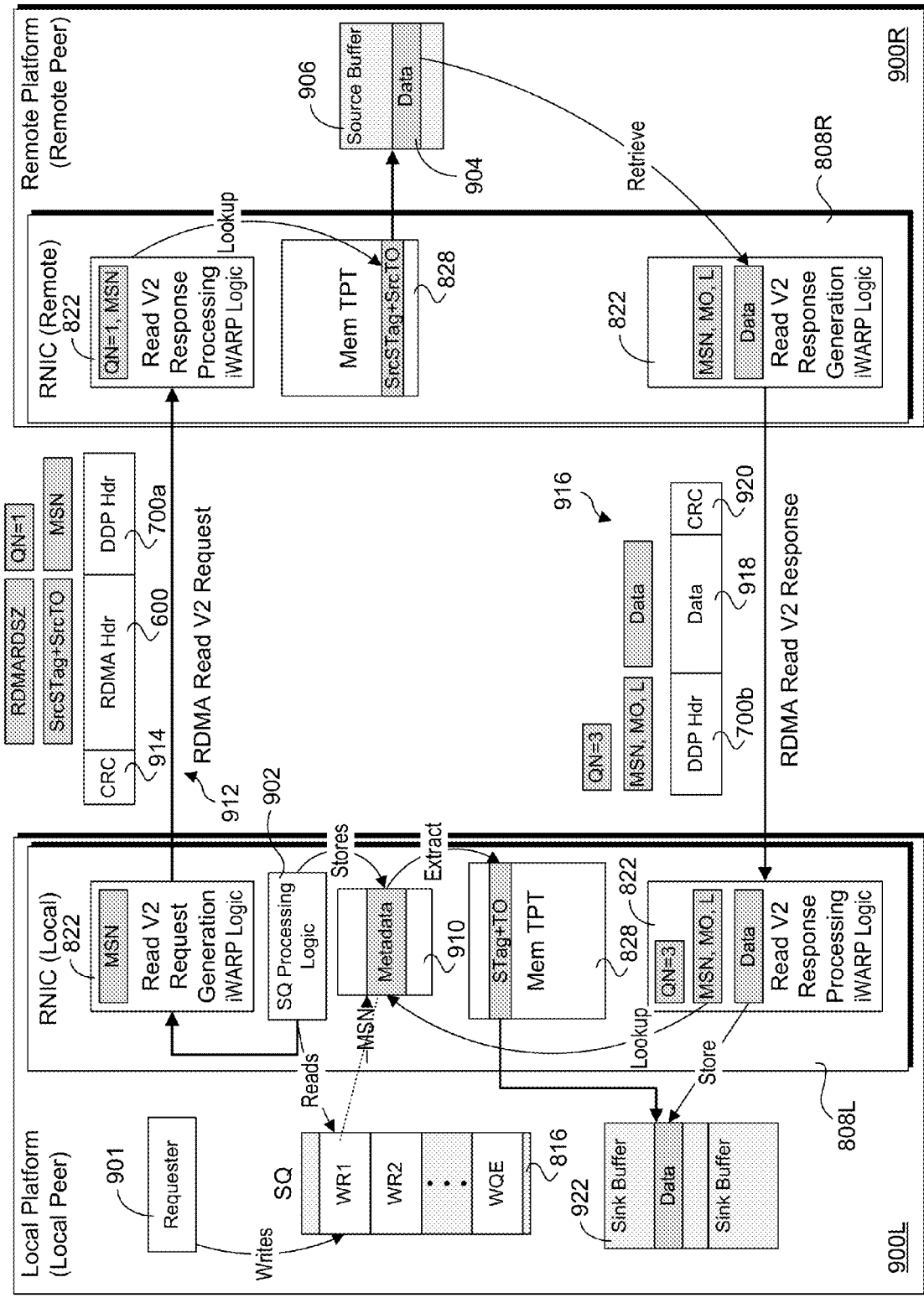
FIG. 9 is a combination schematic and message flow diagram illustrating an exemplary RDMA data transfer using the new RDMA Read V2 Request and Response messages, according to one embodiment.

FIG. 9 illustrates an exemplary RDMA data transfer using the new RDMA Read V2 Request and Response messages, according to one embodiment. Generally, some of the components illustrated in FIG. 9 sharing the same reference numbers as those shown in FIG. 8 are configured in a similar manner. In addition, components delineated by boxes in FIG. 9 may be implemented in other places than those shown, and the configuration is merely exemplary and non-limiting. For example, some components or data structures shown outside of the RNIC blocks may be implemented by an RNIC, while blocks depicted within the RNIC blocks may be implemented outside of the RNICs.

In FIG. 9, a local RNIC 808L implemented on a local platform 900L is communicating with a remote RNIC 808R implemented on a remote platform 900R using iWARP running over TCP/IP on an Ethernet link. When the Ethernet link is a wired cable, this type of data transfer is commonly referred to as an iWARP wire transfer, or otherwise uses the iWARP wire protocol. Under iWARP, RDMA messages are exchanged between local and remote RDMA peers (e.g., local and remote platforms, such as computers and servers); from the perspective of either peer, it considers itself the local peer, while the RDMA peer it is communicating with is the remote peer. As a result, iWARP logic on both local and remote RNICs 808L and 808R is configured to support both the local RDMA peer and remote RDMA peer operations described herein.

Under the example of FIG. 9, a software application running on local platform 900L desires to Read data stored at a predetermined buffer location in system memory for the remote platform 900R using an iWARP RDMA Read transfer. As discussed above, under a conventional iWARP RDMA Read operation, the local peer reveals its sink buffer location to the remote peer using a tagged RDMA message. Under the new RDMA Read V2 Read and Response messages disclosed herein, this is no longer required, as the sink buffer location is not revealed to the remote peer, and untagged RDMA messages are used.

The process begins with a requester 901 creating a work request WR1 and adding it (i.e., writing it) to SQ 816, which may either be located in system memory (as depicted) or cached on RNIC 808L. SQ processing logic 902 on RNIC 900L reads the SQ work request WR1 (e.g., in response to a doorbell ring), which corresponds to a Read V2 Request and also identifies a location of data 904 in a source buffer 906 on remote platform 900R that is to be returned to local platform 900L via RNICs 808R and 808L, as well as a destination location at which the returned data is to be DMA'ed. In accordance with well-known RDMA techniques, the location of the requested data has been previously determined in connection with generation of work request WR1.

In connection with processing work request WR1, SQ processing logic 902 also stores metadata 908 relating to the request. As depicted, the metadata may be stored in a buffer 910 or other storage structure on RNIC 808L, or may be stored in a buffer or the like in system memory on local platform 900L. In one embodiment metadata 908 includes work request WR1, either in its entirety or relevant data relating to the request. In implementations under which SQ WQEs are cached on an RNIC, the metadata may simply comprise a pointer to the applicable work request. In one embodiment, the metadata is stored such that it can be subsequently located using an MSN value, as discussed below; the MSN value corresponds to the MSN the requester expects to be returned in the Read V2 Response message.

SQ processing logic 902 further passes a request to or otherwise causes iWARP logic 822 to generate a Read V2 Request message 912. As part of this process, the requestor passes a Message Sequence Number (MSN) to Read V2 Request message generation logic to be included in the DDP of the message, as described above and shown in FIG. 7. In one embodiment, the MSN specifies a 32-bit sequence number that is increased by one (modulo 2^32) with each DDP Message targeting the specific Queue Number on the DDP Stream associated with the applicable DDP Segment. The initial value for MSN is 1, and the MSN wraps to 0 after a value of 0xFFFFFFFF. For the present example, the MSN value will correspond to the current MSN for the Read request. (It will be recognized by those skilled in the RDMA arts that request for transfer of a file, for example, may entail use of multiple Read Request messages).

As depicted in the upper center portion of FIG. 9, Read V2 Request message 912 includes an untagged buffer DDP header 700a followed immediately by an RDMA header 600, and a CRC (Cyclic Redundancy Check) field 914 in which a CRC calculation corresponding to the message content is stored. The message would also include lower layer headers and encapsulation relating to TCP/IP over Ethernet data transfers that are well-known and not shown for clarity. As described above with reference to FIG. 7, DDP header 700a includes a QN value of 1 and an MSN value of N, which represents an integer corresponding to the applicable MSN value. RDMA header 600 is similar to that shown in FIG. 6 and includes an RDMA Read message size and a source buffer STag and source buffer Tagged Offset that is used to locate the requested data.

Upon receiving Read V2 Request message 912 at RNIC 808R, lower layer processing is performed and the resulting iWARP message data is processed via Read V2 Response message processing logic in iWARP logic 822. This logic extracts the QN value, the MSN value, the RDMARDSZ value and the SrcSTag and SrcTO values. The RDMA Read message size value identifies this size of the requested data corresponding to the work request. Depending on the size specified, the data may be returned in an RDMA Read V2 Response including a single DDP segment, or may require multiple DDP segments. The SrcSTag and SrcTO values are forwarded to Memory TPT 828, which maps these inputs to the location of data 904 in source buffer 906.

The RDMA Read V2 Response message corresponding to the Read request is generated by Read V2 Response message generation logic in iWARP logic 822 depicted toward the bottom of remote RNIC 808R. This logic is employed to generate an RDMA Read V2 Response message 916 including a DDP header 700b, followed by a data field 918 and a CRC field 920. As shown, DDP header 700b includes the MSN value N, a Message Offset (MO) value M, and an L-bit value of 1 if this is the last DDP segment of a DDP message for a given MSN (and RDMA Read V2 Request message); otherwise, the L-bit is set to 0. The returned data 904 is contained in data field 918. As discussed above, QN=3 for RDMA Read V2 Response messages. In one embodiment the MO value M specifies the offset, in octets, from the start of the DDP Message represented by the MSN and QN on the DDP Stream associated with the applicable DDP Segment. The MO referencing the first octet of the DDP Message is set to zero by the DDP layer.

Upon receiving RDMA Read V2 Response message 916 at local RNIC 808L, the queue number, MSN, MO, L-bit and data are extracted by Read V2 Response message processing logic in iWARP logic 822 (after lower layer processing has been performed by the TCP stack). QN=3 identifies the data is returned in response to a corresponding RDMA Read V2 Request message, while the MSN value N is used to match up the request. The MSN value is also used to lookup metadata 908, which includes information identifying the location of the sink buffer 922 (i.e., address in system memory) at which the data 904 is to be written. As illustrated, this address is mapped by memory TPT 828 using a STag and TO that may be generated as a function of the MSN and MO. Upon completion of the transfer, an applicable CQE in the completion queue may be written (not shown), depending if the work request contains indicia indicating the request is signaled or non-signaled.

As discussed above, an RDMA Read V2 Response message including a single or multiple DDP segments may be returned in response to a given RDMA Read V2 Request message. Moreover, a transfer of a file stored in system memory (e.g., after being read for a non-volatile storage device and written to system memory) on a remote RDMA peer may require use of multiple work requests, resulting in multiple RDMA Read V2 Request and Response messages.

As illustrated in FIG. 9 and described above, the new RDMA Read V2 Request message does not expose a sink buffer STag and TO on the wire. Moreover, RDMA Read V2 Response is an untagged message, as oppose to the tagged message structure used for a conventional RDMA Read Response message.

Exemplary RNIC System Architecture

Figure 10:
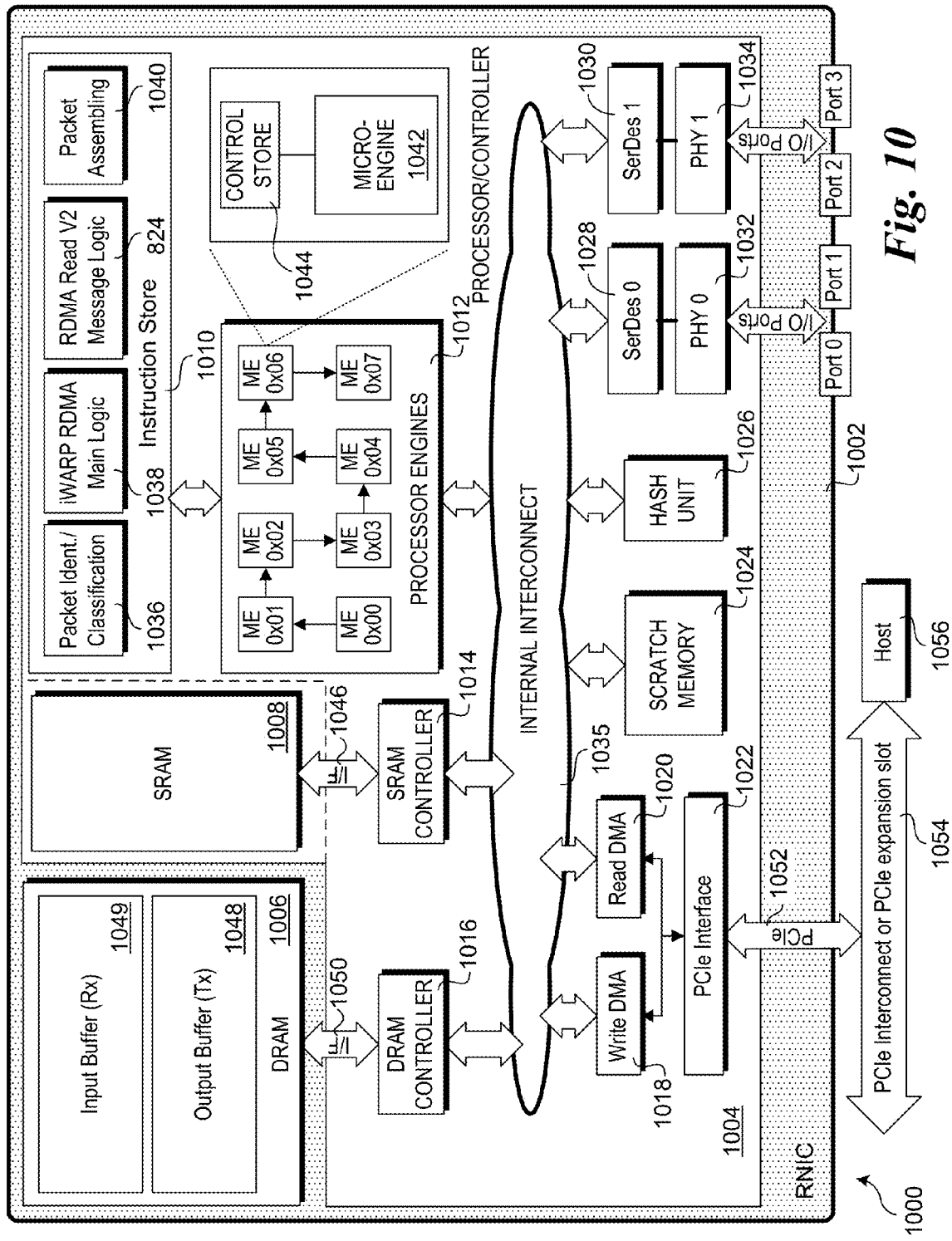
FIG. 10 is a schematic diagram illustrating an RNIC architecture that may be used for implementing aspects of the embodiments disclosed herein.

An exemplary system architecture for an RNIC 1000 that may be configured to implement aspects of the iWARP RNIC embodiments described herein is shown in FIG. 10. RNIC 1000 includes a NIC system board 1002 on which a network processor/controller 1004, and memory comprising Dynamic Random Access Memory (DRAM) 1006 and SRAM 1008 are mounted. In one embodiment, SRAM 1008 is integrated on processor/controller 1004. Under various embodiments. NIC system board 1002 is representative of an Ethernet controller card, a daughter board, a multi-chip module board or substrate, or it may be part of a computer system board, such as a main board or motherboard for a computer server. Processor/controller 1004 is representative of Ethernet processing and/or control unit, and may be embodied in various forms, including as an Ethernet controller chip or a network processor unit (NPU). RNIC functionality may also be implemented via a stand-alone integrated circuit (e.g., a separate chip).

In the illustrated embodiment, processor/controller 1004 includes an instruction store 1010, a cluster of processor engines 1012, an SRAM controller 1014, a DRAM controller 1016, a Write DMA block 1018, a Read DMA block 1020, a PCIe interface 1022, a scratch memory 1024, a hash unit 1026, Serializer/Deserializers (SerDes) 1028 and 1030, and Physical Layer (PHY) interfaces 1032 and 1034. Each of the components is interconnected to one or more other components via applicable interconnect structure and logic that is collectively depicted as an internal interconnect cloud 1035.

Instruction store 1010 includes various instructions that are executed by processor engines cluster 1012, including packet identification/classification instructions 1036, iWARP RDMA main logic 1038, RDMA Read V2 message logic 824 and packet assembling logic 1040. Processor engines cluster 1012 includes a plurality of microengines 1042, each coupled to a local control store 1044. Under one embodiment, various operations such as packet identification and classification are performed using a pipelined architecture, such as illustrated in FIG. 10, with each microengine performing an associated operation in the pipeline. As an alternative, processor engines cluster 1012 is representative of one or more processor cores in a central processing unit or controller. As yet another option, the combination of processor engines 1012 and instruction store 1010 may be implemented as embedded logic, such as via a Field Programmable Gate Array (FPGA) or the like, or through other embedded logic circuitry.

In one embodiment, instruction store 1010 is implemented as an on-chip store, such as depicted in FIG. 10. Optionally, a portion or all of the instructions depicted in instruction store 1010 may stored in SRAM 1008 (if off-chip) and accessed using SRAM controller 1014 via an interface 1046. SRAM 1008 may also be used for storing selected data and/or instructions relating to packet processing operations, as well as cache page table entries.

DRAM 1006 is used to for implementing one or more Input Buffers 1049 and one or more Output Buffers 1048, and is accessed using DRAM controller 1016 via an interface 1050. Optionally, all or a portion of an RNIC's input and output buffers may be integrated on an RNIC chip or on a separate PHY chip. Write DMA block 1018 and Read DMA block 1020 are respectively configured to support DMA Write and Read operations in accordance with the embodiments described herein. In the illustrated embodiment, DMA communication between DRAM 1006 and a platform host circuitry is facilitated over PCIe interface 1022 via a PCIe link 1052 coupled to a PCIe interconnect or PCIe expansion slot 1054, enabling DMA Write and Read transfers between DRAM 1006 and system memory for a host 1056 using the PCIe protocol. However, the use of PCIe is merely exemplary and not limiting, as other interconnect architectures and protocols may be used.

Scratch memory 1024 and hash unit 1026 are illustrative of components employed by NICs for facilitating scratch memory and hashing operations relating to packet processing. For example, a hash operation may be implemented for deriving flow IDs and for packet identification.

PHYs 1032 and 1034 facilitate Physical layer operations for the RNIC, and operate as a bridge between the digital domain employed by the RNIC logic and components and the analog domain employed for transmitting data via electrical, optical or wired signals. For example, in the illustrated embodiment of FIG. 10, each of PHYs 1032 and 1034 is coupled to a pair of I/O ports configured to send electrical signals over a wire cable such as a Cat5e, Cat6, or Cat7 cable. Optical and wireless signal embodiments would employ additional circuitry and interfaces for facilitating connection via optical and wireless signals (not shown). In conjunction with PHY operations, SerDes 1028 and 1030 are used to serialize output packet streams and deserialize inbound packet streams. Although four ports (0-3) are shown, an RNIC may have other number of ports.

In addition to the instructions shown in instruction store 1010, other instructions may be implemented via execution of processor engines 1012 or other processing means to facilitate additional operations. For example, in one embodiment, NIC 1000 is configured to implement a TCP/IP stack on the RNIC itself, as illustrated by TCP stack 826 in FIG. 8 and discussed above. RNIC 1000 may also be configured to facilitate TCP operations in a manner that is offloaded from the Operating System TCP facilities, whereby once a packet is sent outbound, RNIC 1000 is responsible for processing an ACK message and resending the packet if an ACK message is not received within an applicable TCP timeout period.

RDMA main logic 1036 comprises instructions and logic for facilitating RDMA data transfer operations, which may include conventional RDMA operations. MMU RDMA Read V2 message logic 824 includes logic for generating and processing the various RDMA Read V2 Read and Response message embodiments and operations described herein. Although depicted as separate blocks for illustrative and discussion purposes, the various instructions in instruction store 1010 may logically be divided into a greater or lesser number of blocks or modules, or may be implemented as a single iWARP RDMA embedded application.

In addition to support for iWARP RDMA operations, an RNIC may be configured perform conventional NIC operations, including operations relating to packet forwarding. Accordingly, RNIC 1000 may be configured to store data for facilitating packet identification and classification, including forwarding filters and rules either locally or using a Memory-Mapped IO (MMIO) address space in system memory. When stored locally, this data may be stored in either DRAM 1006 or SRAM 1008. Data stored in a MMIO address space may be accessed by RNIC 1000 via Read DMA operations. Generally, setting up MMIO address space mapping may be facilitated by an RNIC device driver in coordination with the operating system. The RNIC device driver may also be configured to enable instructions in instruction store 1010 to be updated via the operating system. Optionally, the instructions in instruction store may comprise firmware instructions that are stored in non-volatile memory, such as Flash memory, which may either be integrated on processor/controller 1004 or mounted to NIC system board 1002 (not shown).

In addition, embodiments of the present description may be implemented not only within a semiconductor chip but also within machine-readable media. For example, the designs described above may be stored upon and/or embedded within machine readable media associated with a design tool used for designing semiconductor devices. Examples include a netlist formatted in the VHSIC Hardware Description Language (VHDL) language, Verilog language or SPICE language. Some netlist examples include: a behavioral level netlist, a register transfer level (RTL) netlist, a gate level netlist and a transistor level netlist. Machine-readable media also include media having layout information such as a GDS-II file. Furthermore, netlist files or other machine-readable media for semiconductor chip design may be used in a simulation environment to perform the methods of the teachings described above.

Also, aspects of some embodiments may be implemented via software-based components, such as but not limited to RNIC driver 811, software library 813, and software application 812. Thus, embodiments of this invention may be used as or to support a software program, modules, components, etc., executed upon some form of processing core (such as the CPU of a computer) or otherwise implemented or realized upon or within a non-transient machine-readable medium. A machine-readable medium includes any mechanism for storing information in a form readable by a machine (e.g., a computer). For example, a machine-readable medium may include a read only memory (ROM); a random access memory (RAM); a magnetic disk storage media; an optical storage media; and a flash memory device, etc.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As discussed above, various aspects of the embodiments herein may be facilitated by corresponding software and/or firmware components and applications, such as software running on a server or firmware executed by an embedded processor on a network element. Thus, embodiments of this invention may be used as or to support a software program, software modules, firmware, and/or distributed software executed upon some form of processing core (such as the CPU of a computer, one or more cores of a multi-core processor), a virtual machine running on a processor or core or otherwise implemented or realized upon or within a machine-readable medium. A machine-readable medium includes any mechanism for storing or transmitting information in a form readable by a machine (e.g., a computer). For example, a machine-readable medium may include a read only memory (ROM); a random access memory (RAM); a magnetic disk storage media; an optical storage media; and a flash memory device, etc.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. An apparatus, comprising:
an Ethernet network interface, configured to send and receive packetized data over an Ethernet Network; and
Internet Wide Area Remote Direct Memory Access (RDMA) Protocol (iWARP) logic, configured to facilitate operations when the apparatus is operating including generating an RDMA Read V2 Request message including an RDMA Read V2 Request header with a an RDMA message opcode identifying the message as an RDMA Read V2 Request message,
wherein the apparatus is further configured, when operating, to operate as an RDMA local peer and to send the RDMA Read V2 Request message outbound from the Ethernet network interface to an RDMA remote peer, and wherein the RDMA Read V2 Request message is configured to be implemented with an RDMA Read V2 Response message in a manner that enables the apparatus to read data stored on the RDMA remote peer using RDMA semantics without granting remote access rights to the RDMA remote peer.

2. The apparatus of claim 1, wherein the RDMA Read V2 Request header comprises:
an RDMA read message size;
a Data Source Steering Tag (SrcSTag); and
a Data Source Tagged Offset (SrcTO).

3. The apparatus of claim 2, wherein the RDMA Read V2 Request message includes a Direct Data Placement Protocol (DDP) header that is immediately followed by the RDMA Read V2 Request header.

4. The apparatus of claim 3, wherein the DDP header comprises an untagged buffer DDP header with a queue number (QN) field having a value of 1.

5. The apparatus of claim 3, wherein the iWARP logic is further configured to facilitate operations when the apparatus is operating, including:
storing metadata identifying a location of a buffer in which data returned in an RDMA Read V2 Response message is to be stored, the metadata including a Message Sequence Number (MSN) having a value N;

generating an RDMA Read V2 Request message including a DDP header having a MSN field with a value of N;

processing an RDMA Read V2 Response message that has been received from the RDMA remote peer and was generated by the RDMA remote peer in response to the RDMA Read V2 Request message, the RDMA Read V2 Response message including a DDP header having an MSN field with a value of N and a Message Offset (MO) value M and including a data field having data associated with the RDMA Read V2 Request message; and employing the MSN value N, the MO value M, and the metadata to identify a location at which the data is to be stored.

6. The apparatus of claim 5, wherein the RDMA Read V2 Request message is generated in connection with processing a Work Request Entry (WQE) in a Send Queue (SQ), and wherein the metadata includes at least a portion of data contained in the WQE.

7. The apparatus of claim 1, wherein the iWARP logic is further configured to facilitate operations when the apparatus is operating, including generating a RDMA Read V2 Response message, wherein the RDMA Read V2 Response message does not include an RDMA header and includes a Direct Data Placement Protocol (DDP) header and one or more DDP Segments associated with the RDMA Read V2 Response message.

8. The apparatus of claim 7, wherein the DDP header comprises an untagged buffer DDP header with a queue number field value of 3.

9. The apparatus of claim 8, wherein the untagged buffer DDP header further comprises a Message Sequence Number (MSN) field and a Message Offset (MO) field.

10. The apparatus of claim 7, wherein the iWARP logic is further configured to process a RDMA Read V2 Request message sent from a remote RDMA peer and received via the Ethernet network interface and generate an RDMA Read V2 Response message in response to the RDMA Read V2 Request message.

11. The apparatus of claim 10, wherein the RDMA Read V2 Request message sent from the remote RDMA peer references a message size that spans multiple buffers and in response to processing the RDMA Read V2 Request message the iWARP logic is configured to generate an RDMA Read V2 Response message including multiple DDP segments.

12. The apparatus of claim 1, wherein the apparatus comprises an iWARP RDMA Network Interface Controller (RNIC).

13. A method comprising:
generating a Remote Direct Memory Access (RDMA) Read V2 Request message including a RDMA Read V2 Request header with a first RDMA message opcode identifying the message as an RDMA Read V2 Request message and not including a Data Sink Steering Tag (SinkSTag) or a Data Sink Tagged Offset (SinkTO) parameter; and sending the RDMA Read V2 Request message outbound from an Ethernet network interface to an RDMA remote peer using an Internet Wide Area Remote Direct Memory Access (RDMA) Protocol (iWARP) wire protocol.

14. The method of claim 13, wherein the RDMA Read V2 Request header comprises:
an RDMA read message size;
a Data Source Steering Tag (SrcSTag); and
a Data Source Tagged Offset (SrcTO).

15. The method of claim 14, wherein the RDMA Read V2 Request message includes an untagged buffer Direct Data Placement Protocol (DDP) header that is immediately followed by the RDMA Read V2 Request header.

16. The method of claim 15, wherein the untagged buffer DDP header includes a queue number field with a value of 1.

17. The method of claim 15, further comprising:
storing metadata identifying a location of a buffer in which data returned in an RDMA Read V2 Response message is to be stored, the metadata including a Message Sequence Number (MSN) having a value N;

generating an RDMA Read V2 Request message including a DDP header having a MSN field with a value of N;

processing an RDMA Read V2 Response message that has been received from the RDMA remote peer and was generated by the RDMA remote peer in response to the RDMA Read V2 Request message, the RDMA Read V2 Response message including a DDP header having an MSN field with a value of N and a Message Offset (MO) value M and including a data field having data associated with the RDMA Read V2 Request message; and employing the MSN value N, the MO value M, and the metadata to facilitate identification of a location at which the data is to be stored.

18. The method of claim 17, wherein the RDMA Read V2 Request message is generated in connection with processing a Work Request Entry (WQE) in a Send Queue (SQ), and wherein the metadata includes at least a portion of data contained in the WQE.

19. The method of claim 13, further comprising generating an RDMA Read V2 Response message, wherein the RDMA Read V2 Response message does not include an RDMA header and includes a Direct Data Placement Protocol (DDP) header and one or more DDP Segments associated with the RDMA Read V2 Response message.

20. The method of claim 19, wherein the DDP header comprises an untagged buffer DDP header with a queue number field value of 3.

21. The method of claim 20, wherein the untagged buffer DDP header further comprises a Message Sequence Number (MSN) field and a Message Offset (MO) field.

22. The method of claim 19, further comprising processing an RDMA Read V2 Request message sent from a remote RDMA peer and received via the Ethernet network interface and generating an RDMA Read V2 Response message in response to the RDMA Read V2 Request message.

23. The method of claim 21, wherein the RDMA Read V2 Request message sent from the remote RDMA peer references an RDMA read message size and location of a source buffer, and wherein the method further comprises generating an RDMA Read V2 Response message including multiple DDP segments in response to processing the RDMA Read V2 Request message.

24. A system comprising:
a processor comprising a plurality of cores;
system memory, operatively coupled to the processor;
a Peripheral Component Interconnect Express (PCIe) interconnect, operatively coupled to the system memory;
a Remote Direct Memory Access (RDMA) Network Interface Controller (RNIC), operatively coupled to the PCIe interconnect and configured to support Direct Memory Access (DMA) operations under which data is written to and read from system memory using DMA data transfers over the PCIe interconnect, the RNIC further including,
an Ethernet network interface, configured to send and receive packetized data over an Ethernet Network; and
Internet Wide Area Remote Direct Memory Access Protocol (iWARP) logic, configured to facilitate operations when the system is operating including generating an RDMA Read V2 Request message including an RDMA Read V2 Request header with a an RDMA message opcode identifying the message as an RDMA Read V2 Request message and not including a Data Sink Steering Tag (SinkSTag) or a Data Sink Tagged Offset (SinkTO) parameter,
wherein the system is further configured, when operating, to send the RDMA Read V2 Request message outbound from the Ethernet network interface to an RDMA remote peer.

25. The system of claim 24, wherein the RDMA Read V2 Request header comprises:
an RDMA read message size;
a Data Source Steering Tag (SrcSTag); and
a Data Source Tagged Offset (SrcTO),
wherein the RDMA Read V2 Request message includes an untagged buffer Direct Data Placement Protocol (DDP) header that is immediately followed by the RDMA Read V2 Request header.

26. The system of claim 25, wherein the iWARP logic is further configured to facilitate operations when the system is operating, including:
storing metadata identifying a location of a buffer in which data returned in an RDMA Read V2 Response message is to be stored, the metadata including a Message Sequence Number (MSN) having a value N;
generating an RDMA Read V2 Request message including a DDP header having a MSN field with a value of N;
processing an RDMA Read V2 Response message that has been received from the RDMA remote peer and was generated by the RDMA remote peer in response to the RDMA Read V2 Request message, the RDMA Read V2 Response message including a DDP header having an MSN field with a value of N and a Message Offset (MO) value M and including a data field having data associated with the RDMA Read V2 Request message; and
employing the MSN value N, the MO value M, and the metadata to identify a location at which the data is to be stored.

27. The system of claim 24, wherein the iWARP logic is further configured to facilitate operations when the system is operating, including generating a RDMA Read V2 Response message, wherein the RDMA Read V2 Response message does not include an RDMA header and includes a Direct Data Placement Protocol (DDP) header and one or more DDP Segments associated with the RDMA Read V2 Response message.

28. The system of claim 27, wherein the iWARP logic is further configured to process an RDMA Read V2 Request message sent from a remote RDMA peer and received via the Ethernet network interface and generate an RDMA Read V2 Response message in response to the RDMA Read V2 Request message.

29. The system of claim 28, wherein the RDMA Read V2 Request message sent from the remote RDMA peer references a message size that spans multiple buffers and in response to processing the RDMA Read V2 Request message the iWARP logic is configured generate an RDMA Read V2 Response message including multiple DDP segments.

30. The system of claim 24, further comprising a storage device operatively coupled to the PCIe interconnect, wherein the storage device comprises a machine readable medium storing data and instructions including an RNIC driver which, upon operation of the system, is loaded into system memory and configured to facilitate operation of the RNIC.

* * * * *